United States Patent
Tanabe et al.

(10) Patent No.: US 6,860,359 B2
(45) Date of Patent: Mar. 1, 2005

(54) REAR STRUCTURE OF MOTORCYCLE

(75) Inventors: Gen Tanabe, Saitama (JP); Naohisa Hirao, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/649,775

(22) Filed: Aug. 28, 2003

(65) Prior Publication Data

US 2004/0124031 A1 Jul. 1, 2004

(30) Foreign Application Priority Data

Sep. 10, 2002 (JP) ........................................ 2002-264204

(51) Int. Cl.$^7$ ............................................. B60K 13/04
(52) U.S. Cl. ..................... 180/309; 180/219; 196/37.15
(58) Field of Search ....................... 296/37.15; 180/219, 180/309, 225

(56) References Cited

U.S. PATENT DOCUMENTS

| | | | |
|---|---|---|---|
| 4,475,622 A | | 10/1984 | Tsunoda et al. |
| 4,637,486 A | * | 1/1987 | Iwai ........................... 180/225 |
| 4,799,565 A | * | 1/1989 | Handa et al. ............... 180/69.4 |
| 4,881,614 A | * | 11/1989 | Hoshi et al. ................ 180/225 |
| 5,183,130 A | * | 2/1993 | Nakamura et al. .......... 180/219 |
| 6,354,476 B1 | * | 3/2002 | Alderman ..................... 224/413 |
| 6,523,634 B1 | * | 2/2003 | Gagnon et al. ............. 180/291 |
| 6,640,921 B2 | * | 11/2003 | Okuma ........................ 180/219 |

FOREIGN PATENT DOCUMENTS

| | | | | |
|---|---|---|---|---|
| JP | 3-134216 A | | 6/1991 | |
| JP | 03134216 A | * | 6/1991 | ............. F01N/7/08 |
| JP | 03182892 A | * | 8/1991 | ............ B62M/7/02 |
| JP | 5-221369 A | | 8/1993 | |
| JP | 2723311 B2 | | 11/1997 | |

* cited by examiner

Primary Examiner—Kevin Hurley
(74) Attorney, Agent, or Firm—Birch, Stewart, Kolasch & Birch, LLP (57) ABSTRACT

To secure a space for arranging an on-vehicle component on a motorcycle without increasing the size of the motorcycle. A motorcycle includes a front wheel, an engine, and a rear wheel disposed on a vehicle body in this order from the front. An exhaust pipe extends rearwardly from the engine with a muffler provided at the rear end of the exhaust pipe. The muffler is disposed on the rear portion of the vehicle body frame between left and right rear frames above the rear wheel. The rear portion of the exhaust pipe is connected to the muffler after being disposed near the right rear frame. A space for arranging an on-vehicle component, such as a battery or a key cylinder, is secured between the rear portion of the exhaust pipe and the left rear frame.

20 Claims, 11 Drawing Sheets

REAR STRUCTURE OF MOTORCYCLE

CROSS-REFERENCE TO RELATED APPLICATIONS

The present application claims priority under 35 USC 119 to Japanese Patent Application Nos. 2002-264204 filed on Sep. 10, 2002 the entire contents thereof are hereby incorporated by reference.

BACKGROUND OF THE INVENTION

1. Field of the Invention

The present invention relates to an improvement of a rear structure of a motorcycle.

2. Description of the Background Art

In a motorcycle, Japanese Patent No. 2723311 (P. 2–4, FIGS. 1, 3 and 5) discloses a rear structure in which an exhaust pipe extends rearwardly from an engine and is provided with a muffler at the rear end of the exhaust pipe According to Japanese Patent No. 2723311, in a rear structure of a motorcycle in the related art, a front wheel, an engine, and a rear wheel are disposed on a vehicle body in this order from the front toward the rear. An exhaust pipe extends rearwardly from the engine. A muffler is provided at the rear end of the exhaust pipe with the muffler being disposed on the rear portion of a vehicle body frame between left and right seat rails so as to project upwardly from the seat rail.

A motorcycle includes various on-vehicle components such as a battery or a key cylinder. Thus, it is required to secure a sufficient space for arranging these on-vehicle components. If a space under the seat disposed in front of the muffler can be effectively utilized, it can be used as a space for arranging the on-vehicle components.

However, in the motorcycle in the related art, the rear end of the exhaust pipe, which passes along the center of the vehicle body, is connected to the muffler below the seat. In this case, when considering the effects of hot air emitted from the exhaust pipe, it is difficult to arrange on-vehicle components, which have low heat-resistance, in this space. It is not expedient to provide additional space for on-vehicle components because the size of the motorcycle increases.

SUMMARY AND OBJECTS OF THE INVENTION

Accordingly, an object of the present invention is to provide a technology to secure a space for arranging an on-vehicle component in a motorcycle without increasing the size of the motorcycle.

In order to achieve this object described above, in a motorcycle including a front wheel, an engine, and a rear wheel disposed on a vehicle body in this order from the front toward the rear, an exhaust pipe extends rearwardly from the engine, and a muffler is provided at the rear end of the exhaust pipe. A rear structure of the motorcycle including the muffler is disposed on the rear portion of a vehicle body frame between left and right rear frames above the rear wheel. The rear portion of the exhaust pipe is connected to the muffler after being disposed near the left rear frame or the right rear frame. A space is provided for arranging an on-vehicle component is secured between the rear portion of the exhaust pipe and the right rear frame or the left rear frame.

Since the rear portion of the exhaust muffler is disposed near the left rear frame or the right rear frame, a sufficient space for arranging the on-vehicle component can be secured between the rear portion of the exhaust pipe and the right rear frame or the left rear frame. In addition, the motorcycle is not increased in size.

Since the on-vehicle component is disposed in a space opposite from the exhaust pipe, the heat effect of the exhaust pipe can be minimized. Therefore, mounting of the on-vehicle component on the motorcycle is further facilitated.

The on-vehicle component of the present invention may be a key cylinder for opening and closing a seat locking mechanism for detachably engaging a seat with the rear portion of the vehicle body frame.

A space for arranging the key cylinder can easily be secured at the position which is less effected by heat from the exhaust pipe.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring now to attached drawings, an embodiment of the present invention will be described below. Terms such as "front," "rear," "left," "right," "up" and "down" refer to the direction as viewed by a driver.

Figure 1:
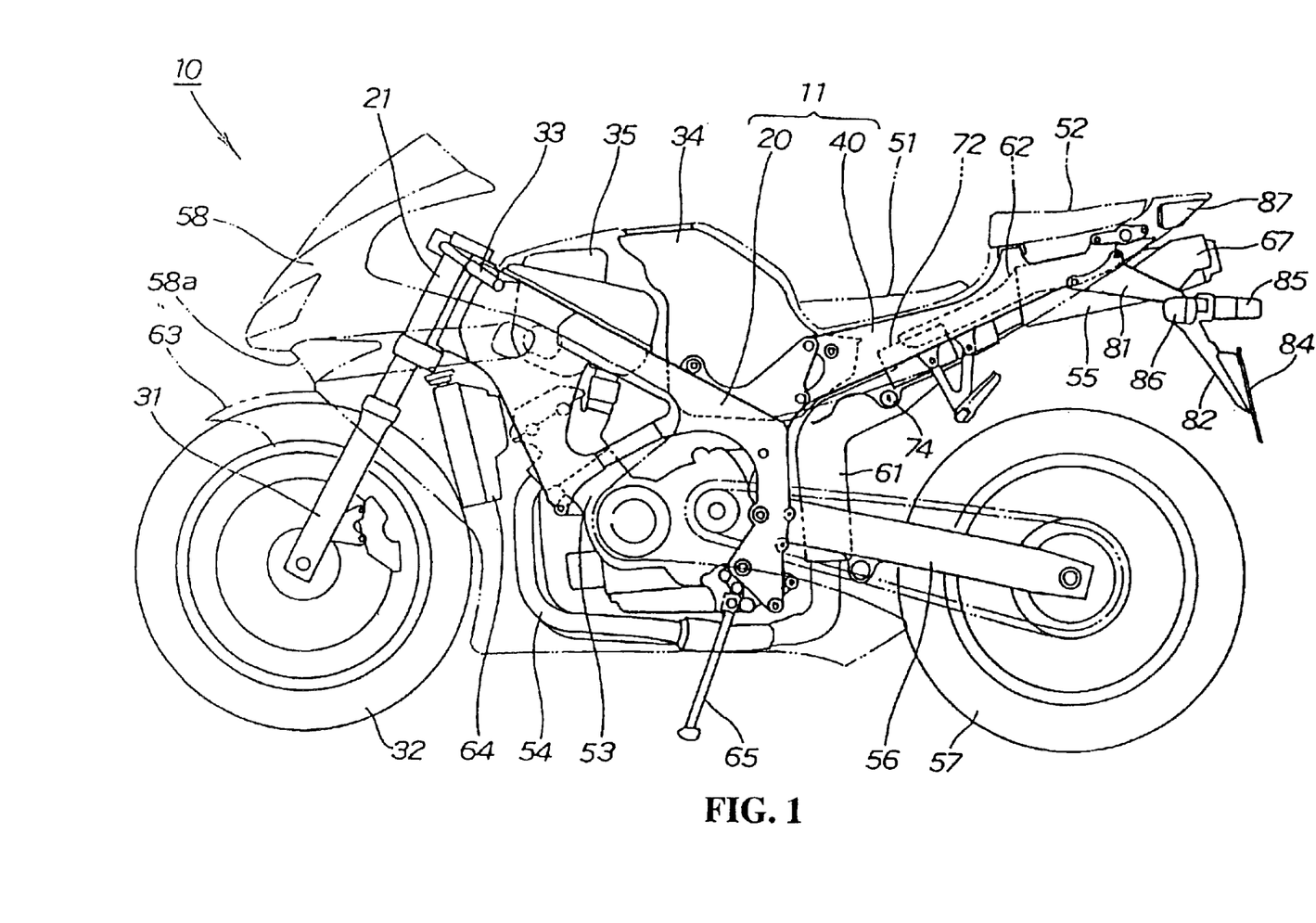
FIG. 1 is a left side view of a motorcycle according to the invention.

FIG. 1 is a left side view of a motorcycle according to the present invention. The motorcycle 10 mainly includes a cradle type vehicle body frame 20, a front fork 31 mounted to a head pipe 21 of the vehicle body frame 20 with a front wheel 32 and a handle 33 connected to the front fork 31. A fuel tank 34 and an air chamber 35 are mounted on the vehicle body frame 20 with a seat rail 40 extending rearwardly from the vehicle body frame 20. A front seat 51 and a rear seat 52 are mounted on the seat rail 40. A four-cycle engine 53 is disposed in a cradle space of the vehicle body frame 20 with a muffler 55 connected to an exhaust port of the engine 53 via an exhaust pipe 54. A swing arm 56 is suspended by a rear shock absorber (not show) from the rear portion of the vehicle body frame 20 and a rear wheel 57 is attached to the swing arm 56. The vehicle body 11 is covered with a cowl 58 indicated by imaginary lines. More specifically, the vehicle is of full cowling type.

The vehicle body 11 includes the vehicle body frame 20 and the seat rail 40. The seat rail 40 is a rear frame supporting the front and rear seats 51, 52. A driver can sit on the front seat 51 and a fellow passenger can sit on the rear seat 52.

The exhaust pipe 54 is a metal pipe starting from the exhaust port provided on the front portion of the engine 53, passing under the engine 53, extending rearward of the vehicle body frame 20, and from the rear end thereof, extending upwardly along the vehicle body frame 20, and from the upper end thereof, extending along the seat rail 40 to the muffler 55. A heat shielding pipe 61 is provided for covering the exhaust pipe 54. A heat shielding plate 61 is provided for covering the upper portion of the muffler 55. A protector 67 is provided for covering the left and the right rear portions of the muffler 55. The protector 67 is a protecting plate mounted to a stay 81 for mounting a rear fender 82.

As described above, in the motorcycle 10, the front wheel 32, the engine 53, and the rear wheel 57 are mounted from the front to the rear in this order on the vehicle body 11, the exhaust pipe 54 extends rearwardly from the engine 53 with the muffler 55 is attached at the rear end of the exhaust pipe 54. The muffler 55 is disposed on the rear portion of the vehicle body frame 20 between the left and the right seat rails of the seat rail 40 above the rear wheel 57.

In FIG. 1, a front fender 63, a radiator 64, and a stand 65 are provided.

Figure 2:
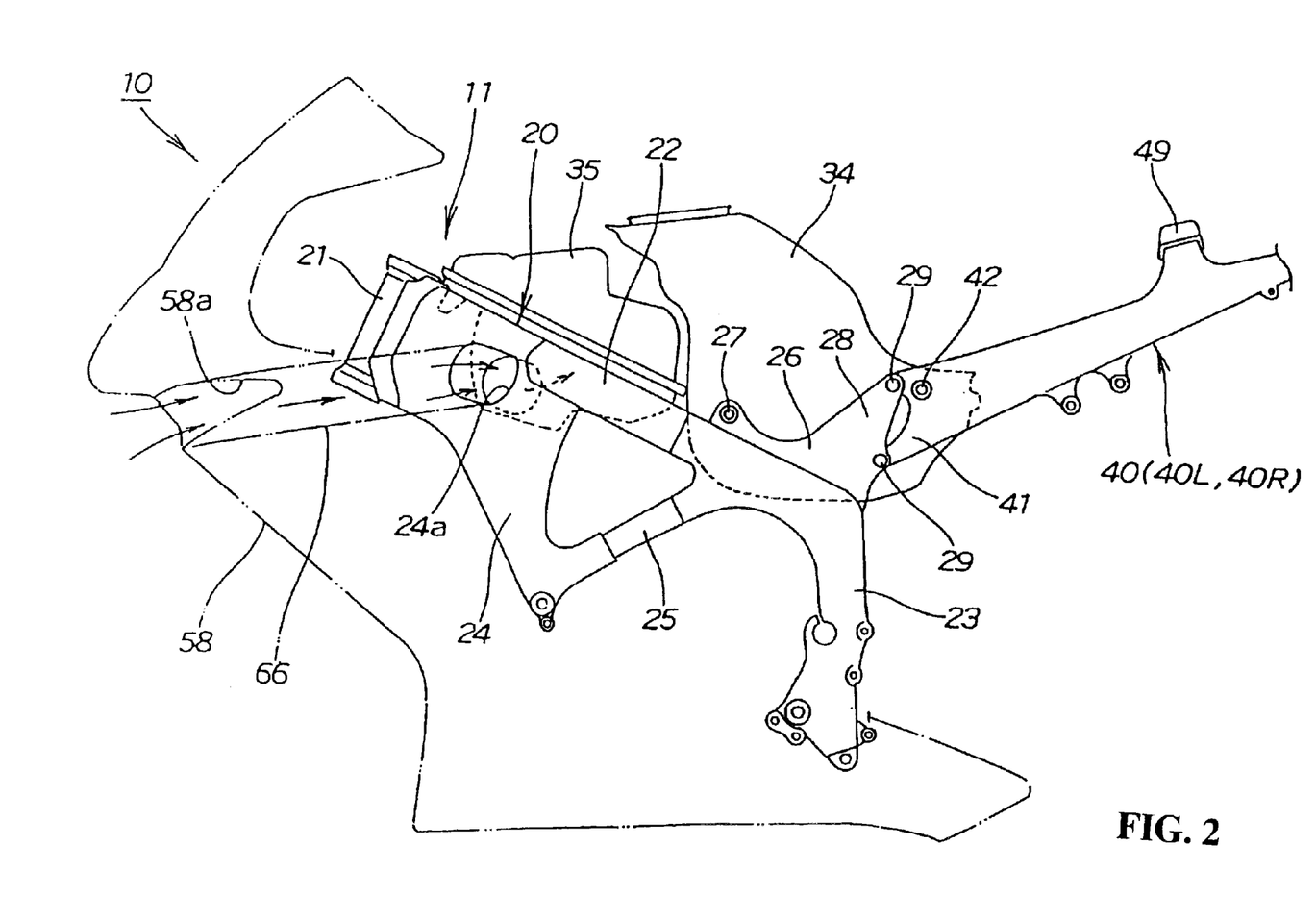
FIG. 2 is a left side view of a vehicle body according to the preset invention.
Figure 3:
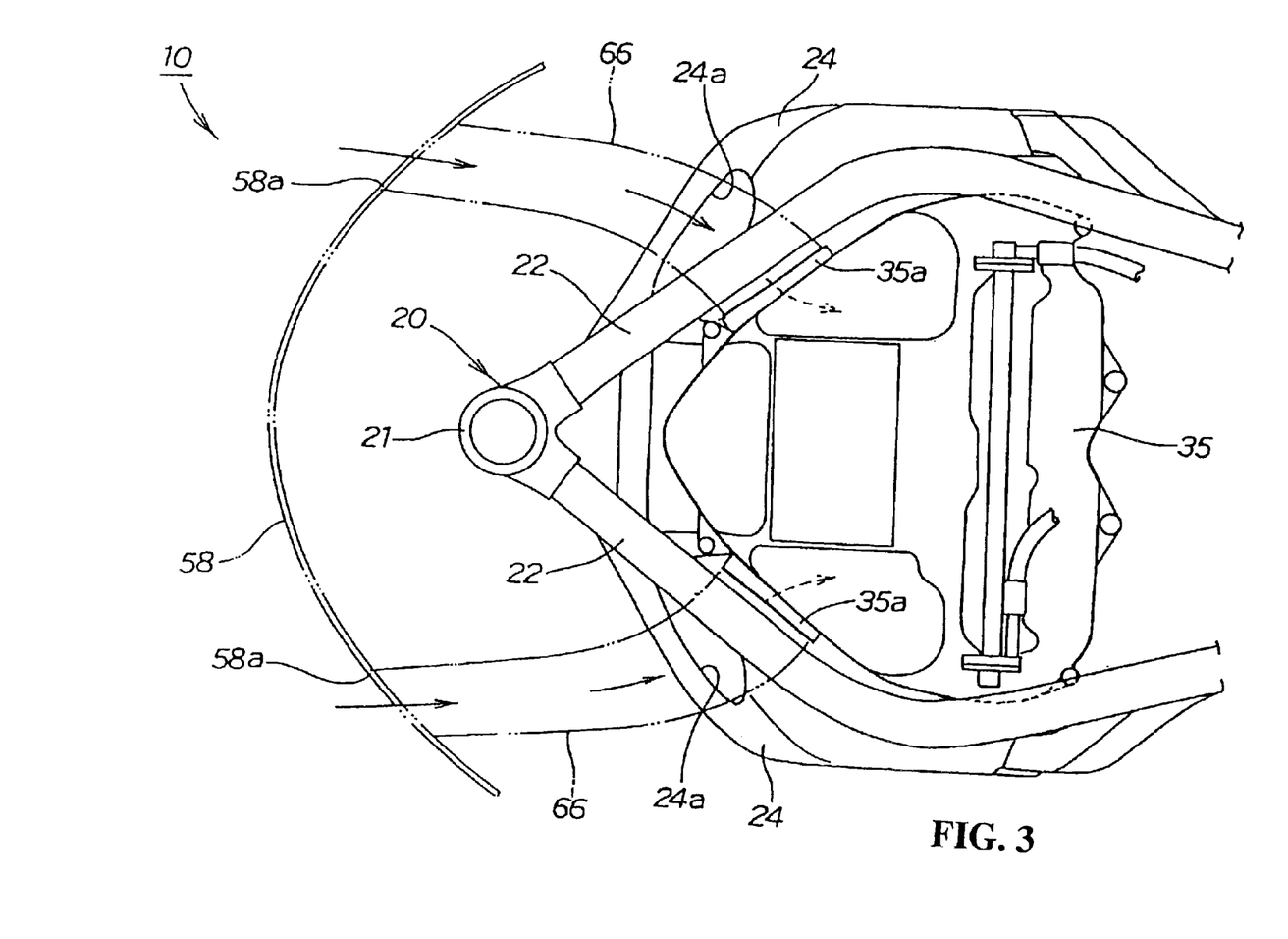
FIG. 3 is a plan view of the vehicle body according to the invention.

FIG. 2 is a left side view of a vehicle body according to the present invention, and FIG. 3 is a plan view of a vehicle body according to the present invention. In FIG. 2 and FIG. 3, the vehicle body frame 20 includes the head pipe 21, left and right main frames 22, 22 extending rearwardly from the head pipe 21, left and right center frames 23, 23 extending downwardly from the rear ends of the main frames 22, 22 (only the left center frame is shown in the figure, hereinafter), left and right down frames 24, 24 extending from the head pipe 21 and the front portions of the main frames 22, 22 obliquely downward toward the rear, left and right upper frames 25, 25 extending from the lower ends of the down frames 24, 24 toward the rear portions of the main frames 22, 22, and a plurality of cross members, which are not shown in the drawing.

Part or all these frame components are formed by metal casting.

The down frames 24, 24 include left and right through holes 24a, 24a at the front portions thereof so as to communicate the inside and the outside. Air intake pipes 66, 66 shown by imaginary lines can be inserted through these through holes 24a, 24a. The air intake pipes 66, 66 connect air vents 58a, 58a formed on the front portion of the cowl 58 and the air intake ports 35a, 35a of the air chamber 35. Alternatively, the through holes 24a, 24a may be utilized as parts of the air intake pipes 66, 66.

The vehicle body frame 20 includes left and right brackets 26, 26 extending upwardly from the rear upper portions of the left and the right main frames 22, 22. The left and the right brackets 26, 26 are supporting members including fuel tank supporting portions 27, 27 on the front portions thereof and seat rail mounting portions 28, 28 on the rear portions thereof. By mounting the seat rail 40 to the seat rail mounting portions 28, 28 via bolts 29, the seat rail 40 can be extended rearwardly from the upper rear portion of the vehicle body frame 20. The fuel tank supporting portions 27, 27 are through holes pierced laterally of the vehicle.

Figure 4:
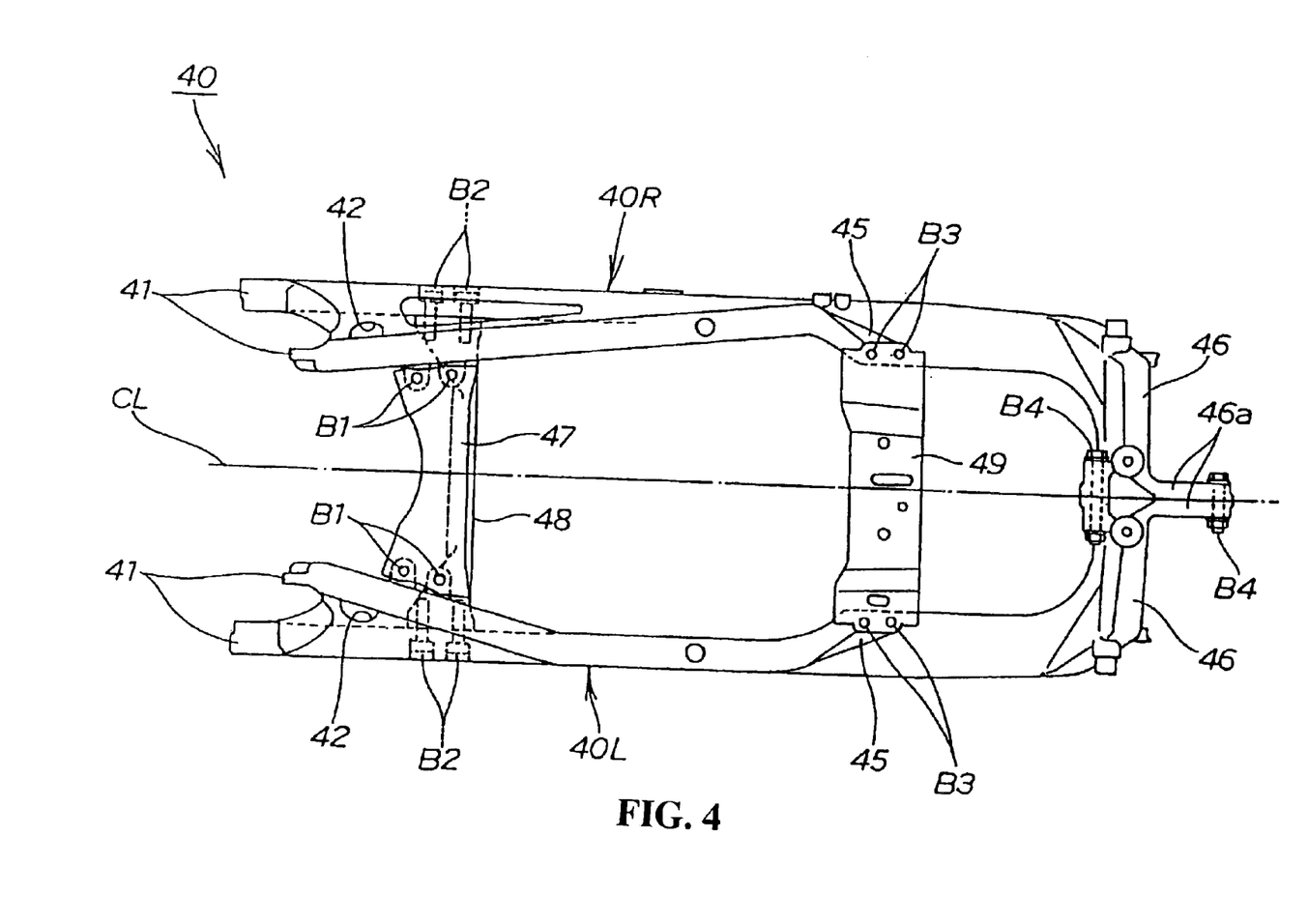
FIG. 4 is a plan view of a seat rail according to the invention.
Figure 5:
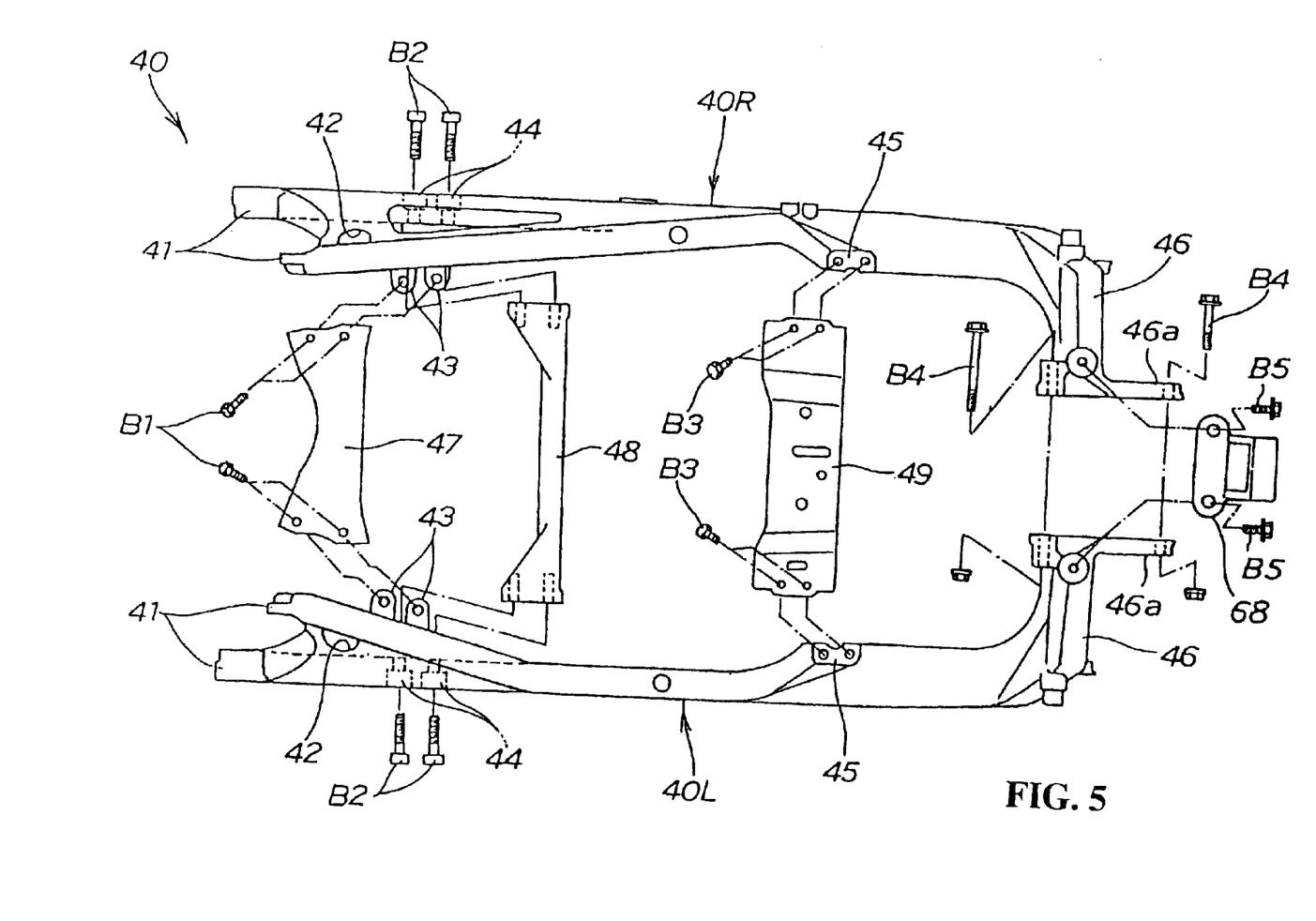
FIG. 5 is an exploded view of the seat rail according to the invention.

FIG. 4 is a plan view of the seat rail according to the present invention, and FIG. 5 is an exploded drawing of the seat rail according to the present invention.

The rear rail 40 includes a left seat rail 40L and a right seat rail 40R divided along the centerline CL of the vehicle extending along the longitudinal direction. Three cross members, that is, a upper front cross member 47, a lower front cross member 48, and a rear cross member 49, are disposed in this order from the front to the rear across the left and the right seat rails 40L, 40R.

The left and the right seat rails 40L, 40R, are constructed of left and right halves each having substantially flat upper and lower surfaces, that are formed by casting. In other words, the surfaces extending laterally of the vehicle (upper and lower surfaces) are substantially flat for enabling fabrication with a split mold, which can be divided laterally of the vehicle, when being molded.

Such left and right seat rails 40L, 40R includes rail mounting portions 41 at the front end (left side of the drawing), fuel tank supporting portions 42, 42 being formed behind the rail mounting portions 41, upper front coupling parts 43, 43 and lower front coupling parts 44, 44 are formed behind the fuel tank supporting portions 42, 42, with rear coupling portions 45, 45 formed behind the front lower coupling portions 44, 44. Extensions 46, 46 extend from the rear ends (right side of the drawing) toward the centerline CL of the vehicle extending along the longitudinal of the vehicle. Flanges 46a, 46a are provided for mating the extremities thereof with respect to each other, all of which are formed integrally.

The fuel tank supporting portions 42, 42 are through holes formed so as to pierce in the lateral direction of the vehicle.

The left and the right seat rails 40L, 40R are combined with each other by the steps of (1) superimposing the upper front cross member 47 on the upper front coupling parts 43, 43 from above so as to extend across therebetween and securing by securing members B1 such as bolts, (2) sandwiching the both ends of the lower front cross member 48 with the lower front coupling parts 44, 44 and securing with securing members B2 such as bolts, (3) superimposing the rear cross member 49 on the rear coupling parts 45, 45 from above and securing by securing members B3 such as bolts, and (4) mating the flanges 46a, 46a and securing them with securing members B4 such as bolts.

In this manner, the seat rail 40 is a casting having a substantially flat upper surface, including at least one cross member 47–49, and the cross member 47–49 can be mounted by securing member B1–B4 such as bolts after assembly.

As shown in FIG. 5, a hook plate 68 (seat mounting member 68) is formed of a plate material that may be mounted to the extensions 46, 46 by securing members B5, B5 such as bolts after assembly. The hook plate 68 is a member for mounting the rear portion of the rear seat 52 (See FIG. 1).

Figure 6:
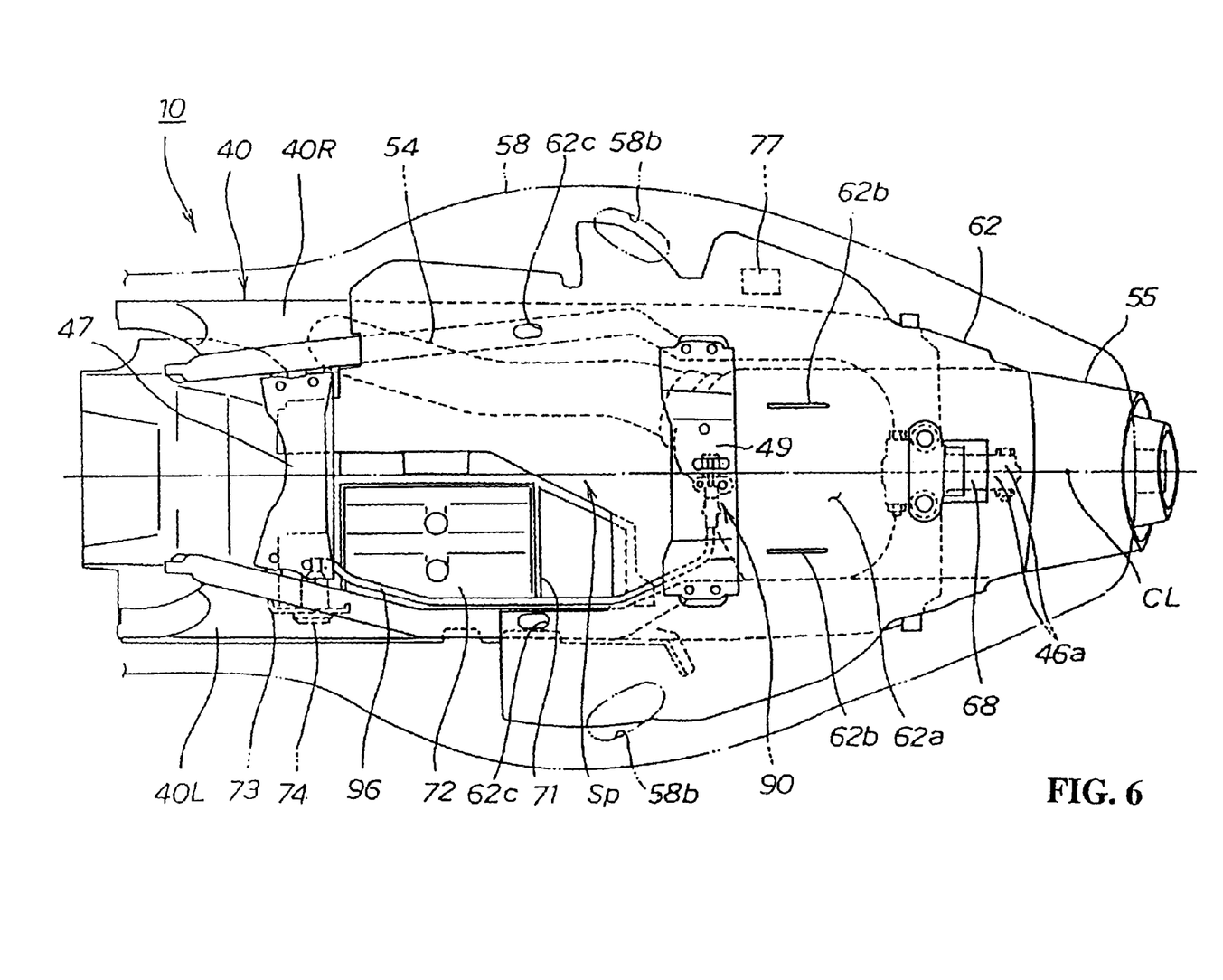
FIG. 6 is a plan view of a principal portion of the rear portion of the vehicle body according to the invention.
Figure 7:
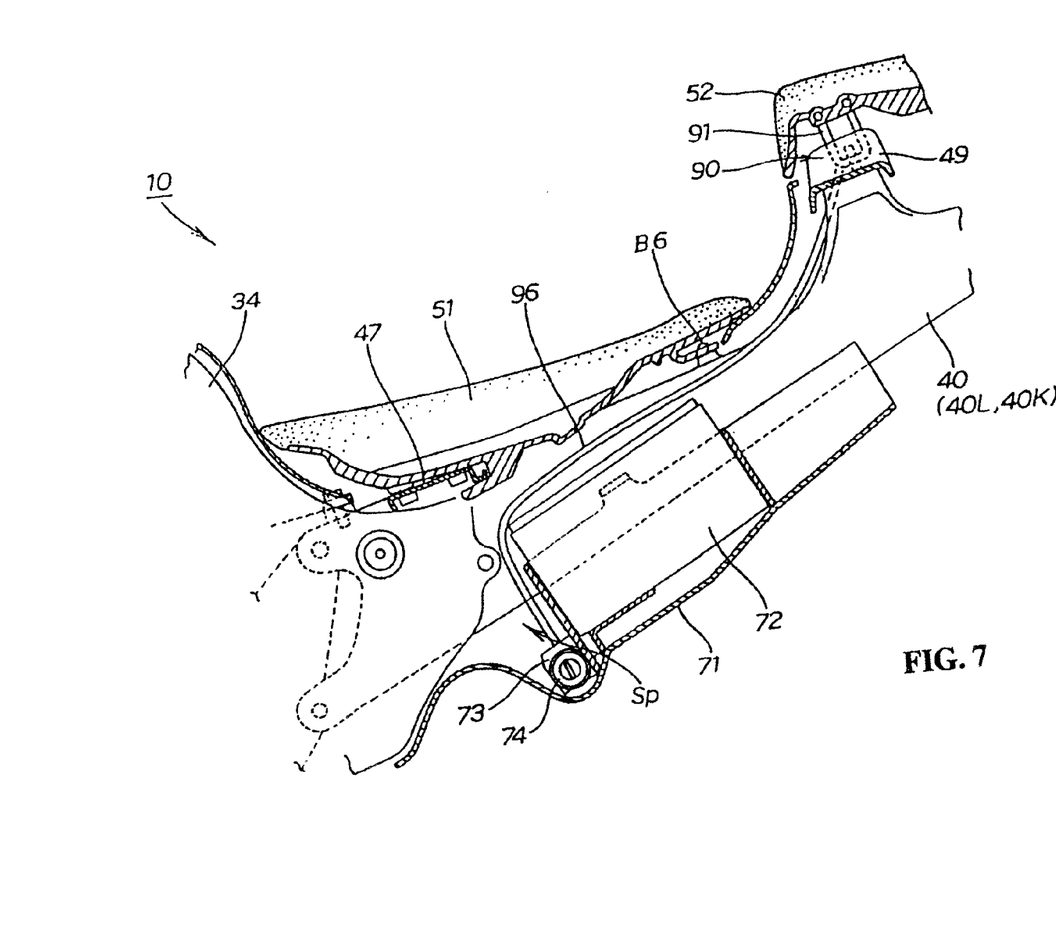
FIG. 7 is a cross-sectional left side view of the area around the front seat according to the invention.

FIG. 6 is a plan view of a principal portion of the rear portion of the vehicle body according to the present invention, and FIG. 7 is a cross-sectional left side view of the area around the front seat according to the invention.

FIG. 6 shows a state in which the muffler 55 is disposed between the left and the right seat rails 40L, 40R (left and right rear frames 40L, 40R), and the rear portion of the exhaust pipe 54 is disposed close to the right seat rail 40, and then connected to the muffler 55 so that a sufficient space Sp for arranging on-vehicle components such as a battery 72 or a key cylinder 74, is secured between the rear portion of the exhaust pipe 54 and the left seat rail 40L.

The key cylinder 74 is a member for opening and closing a seat locking mechanism 90 for detachably engaging the rear seat 52 (See FIG. 7) with the rear portion of the vehicle body frame 20.

In this manner, since the space Sp on the side opposite from the exhaust pipe 54 is effectively utilized for arranging on-vehicle components 72, 74, a heat effect from the exhaust pipe 54 can be minimized. Therefore, the on-vehicle components 72, 74 can be mounted on the motorcycle 10 more easily. In addition, increase in size of the motorcycle 10 can be avoided.

More specifically, an electric component storing box 71 disposed in the space Sp below the front seat 51 is attached to the seat rail 40, the battery 72 is store in the electric component storing box 71, which is open on top. Subsequently, a stay 73 is attached to the front lower portion of the electric component storing box 71, and the key cylinder 74 is attached to the stay 73.

A space for arranging the key cylinder 74 can easily be secured at a position that is less affected by heat from the exhaust pipe 54.

Furthermore, the battery 72 can be embraced by the electric component storing box 71, and the key cylinder 74 can be embraced by the stay 73, which contributes to elimination of heat effect from the exhaust pipe 54.

The cowl 58 shown in FIG. 6 by imaginary lines includes air introducing holes 58b, 58b on the left and the right sides of the rear portion thereof. The liquid level of a reserve tank 77 for a rear brake disposed in the cowl 58 can be observed visually through the air introducing hole 58b.

Therefore, it is not necessary to provide a check hole for checking the liquid level in the reserve tank 77 for the rear brake additionally on the cowl 58. In addition, since the reserve tank 77 for the rear brake is disposed in the cowl 58, the appearance of the motorcycle 10 is improved.

Figure 8:
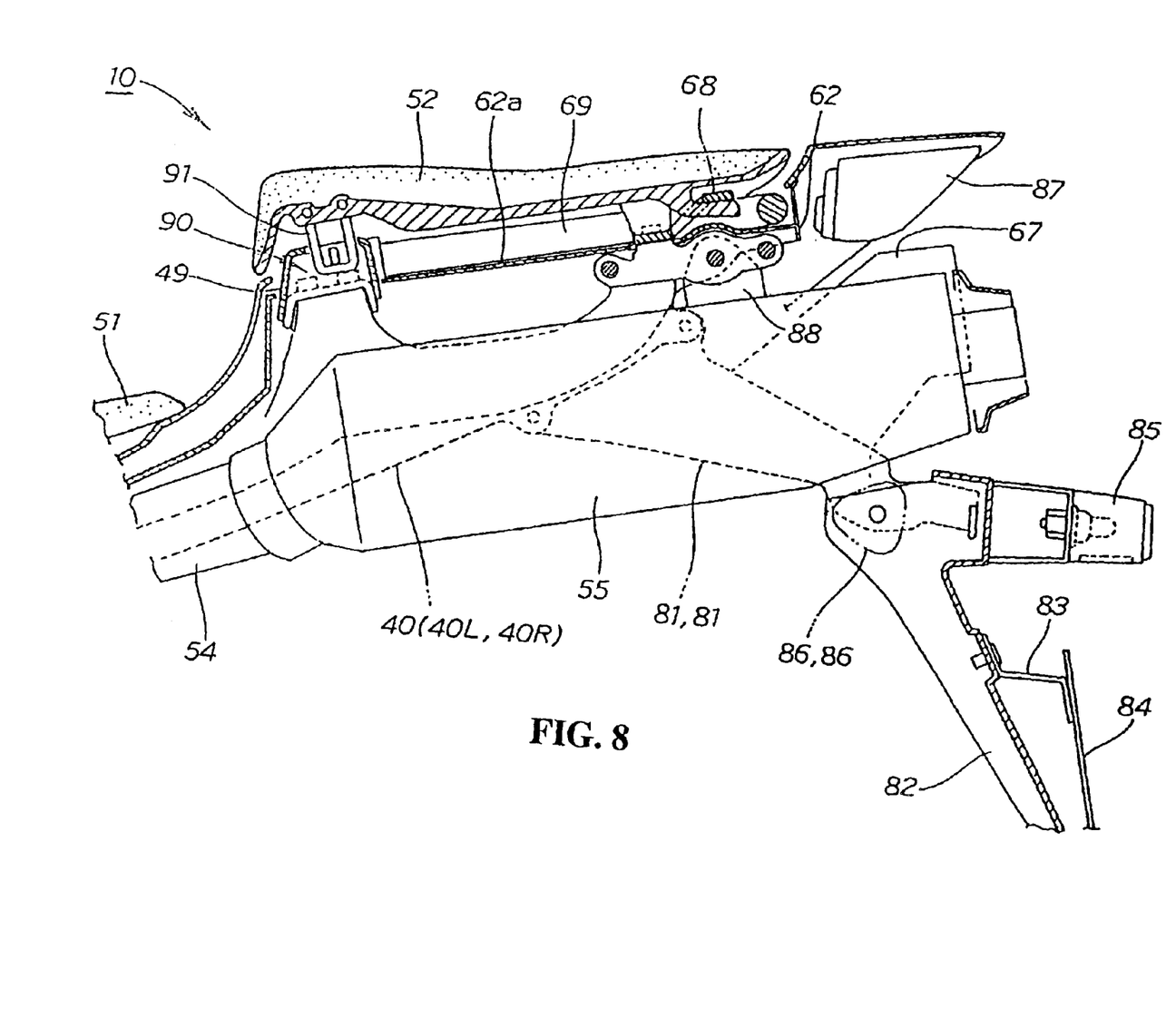
FIG. 8 is a cross-sectional left side view of the area around the rear seat according to the invention.
Figure 9:
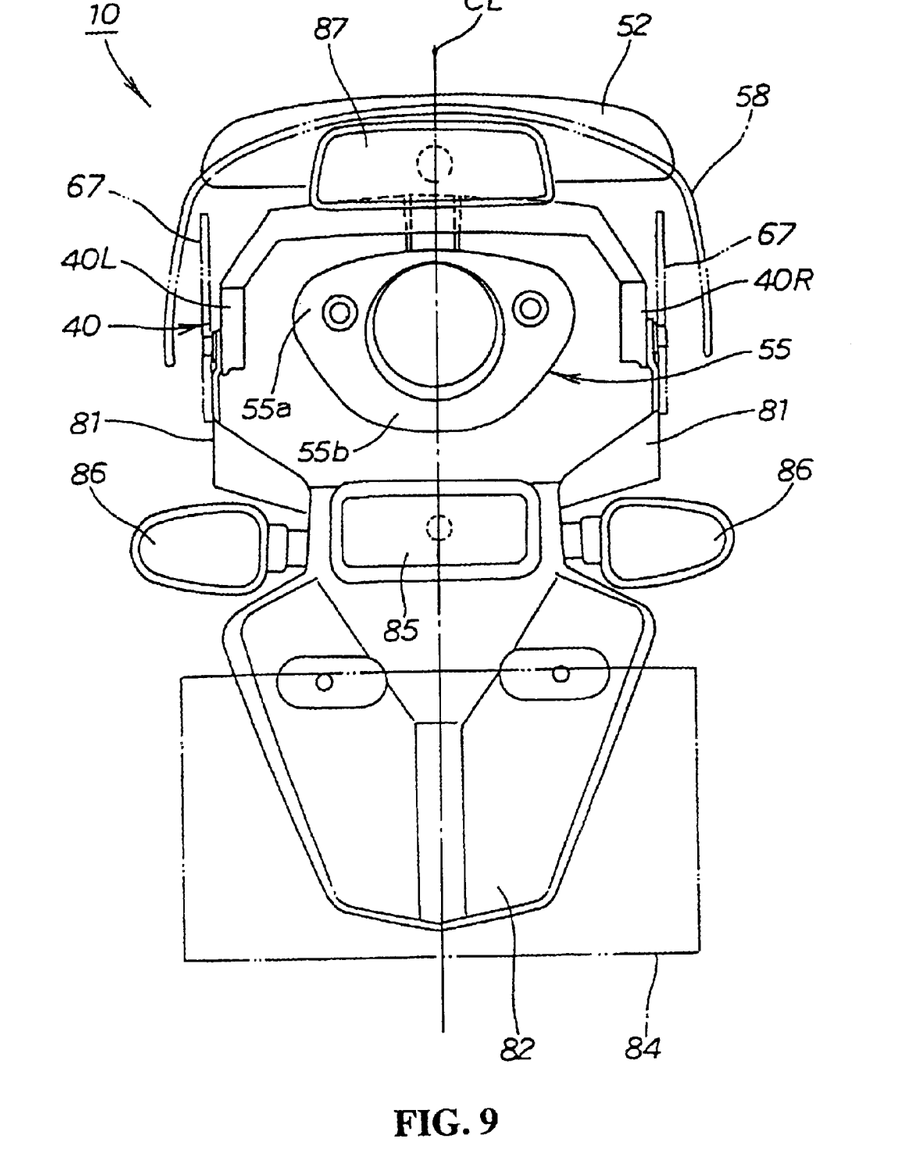
FIG. 9 is a back view of the area around the seat rail, the rear seat, and the muffler according to the invention.

FIG. 8 is a cross-sectional left side view of the area around the rear sheet according to the present invention. FIG. 9 is a back view of the area around the seat rail, the rear seat, and the muffler according to the present invention, showing a state in which the left and the right stays 81, 81 are extend downwardly from the left and the right seat rails 40L, 40R (left and right rear frames 40L, 40R), and the rear fender 82 is attached to the stays 81, 81.

More specifically, the muffler 55 extends rearwardly with respect to the rear ends of the left and the right seat rails 40L, 40R. The left and the right stays 81, 81 are secured to the rear ends of the left and the right seat rails 40L, 40R with bolts and extend rearwardly and downwardly to the position below the rear portion of the muffler 55. The upper left and right portions of the rear fender 82 are secured to the extremities of the stays 81, 81 with bolts or the like.

The rear fender 82 is a member disposed below the muffler 55 and extend rearwardly and downwardly, and is provided with a bracket 83 at the lower rear portion with a license plate lamp 85 or number plate lamp 85 on the upper rear portion thereof. The bracket 83 is a member for securing a number plate 84. The license plate lamp 85 is an illumination lamp for illuminating the number plate 84.

Since the number plate 84 and the license plate lamp 85 may be provided on the rear fender 82, the license plate lamp 85 can be disposed at the optimal position for illuminating the number plate 84. Therefore, the visibility of the number on the number plat 84 can be improved.

The left and the right stays 81, 81 are further provided with left and right rear blinkers 86, 86 (See FIG. 9).

The seat rail 40 (left and right seat rails 40L, 40R) is provided with a tail lamp 87 at the level higher than the muffler 55. The tail lamp 87 is constructed of a light-emitting diode (LED) which is small and has a relatively high heat endurance property. Therefore, the tail lamp 87 can be disposed in the vicinity of the muffler 55.

In this manner, since the other lamp 87 as compared to the lamp 85 is provided on the rear fender 82 at a level higher than the muffler 55 is provided on the left and the right rails 40L, 40R and the lamps 85 and 87 are provided on the rear portion of the vehicle body separately above and below the muffler 55, the size of each lamp 85, 87 may be reduced.

A muffler hanger 88 is provided for supporting the muffler 55.

In order to improve the appearance and reduce the weight of the motorcycle 10, the portion around the left and the right stays 81, 81 and the portion around the rear fender 82 are reduced in size so as to be adapted to the shape of the rear portion of the vehicle body, as shown in FIG. 9. More specifically, the width of the upper mounting portion of the rear fender 82, that is, of the portion to be mounted to the left and the right stays 81, 81 the dimension in the lateral direction, is set to the same as or smaller than the width of the upper portion 55a of the muffler 55. Therefore, considering the appearance, the left and the right stays 81, 81 are bent so that the distance between the stays 81, 81 are reduced as they extend rearwardly.

On the other hand, the muffler 55 is formed into a substantially tapered shape tapered from the upper portion 55a toward the lower portion 55b, when viewed from the rear as shown in FIG. 9. The tapering angle must simply be adapted to the angle formed by the stays 81, 81 approaching toward each other.

In this arrangement, a gap formed between the left and the right seat rails 40L, 40R, the left and the right stays 81, 81 and the rear fender 82 and the muffler 55 may be evenly set. Since the gap is even, the left and the right seat rails 40L, 40R, the left and the right stays 81, 81, and the rear fender 82 are prevented from locally getting hot due to hot air from the muffler 55.

Furthermore, since the muffler 55 can be formed into a substantially tapered shape tapering from the upper portion toward the lower portion according to the shape of the left and the right seat rails 40L, 40R, the left and the right stays 81, 81, and the rear fender 82, the muffler 55 can be arranged easily. In addition, since the muffler 55 is formed into a substantially tapered shape tapering from the upper portion 55a toward the lower portion 55b, the capacity of the muffler 55 (volume of the expansion chamber) can be sufficiently secured.

As a matter of course, the width of the muffler 55 or the distance between the stays 81, 81 are smaller than the width of the rear cowl portion of the cowl 58 shown by imaginary lines. Therefore, the appearance of the motorcycle 10 is improved.

As is clear from the description above, since the muffler 55 is disposed between the left and the right seat rails 40L, 40R (the left and the right rear frames 40L, 40R) below the upper end of the left and the right seat rails 40L, 40R and above the rear wheel 57 (See FIG. 1), the stays 81, 81 extend downwardly from the left and the right seat rails 40L, 40R. The rear fender 82, disposed below the muffler 55, is attached to the stays 81, 81, and the muffler 55 is formed into a substantially tapered shape tapering from the upper portion 55a toward the lower portion 55b when viewed from the rear, the shape of the muffler 55 can be adapted to the rear portion of the vehicle body.

Therefore, the muffler 55 and the rear fender 82 can be arrange easily, even though the muffler 55 is disposed between the left and the right seat rails 40L, 40R and the rear fender 82 is disposed below the muffler 55, the rear cross member 49 can be disposed across the left and the right seat rails 40L, 40R, so that the rear seat 52 is provided thereon for allowing individuals to sit thereon or luggage to be loaded thereon. Furthermore, the size and weight of the motorcycle 10 may be reduced and the appearance may be improved.

As shown in FIG. 8, in order to cover the upper half of the muffler 55 with the heat shielding plate 62, the heat shielding plate 62 is disposed over the seat rail 40 and then the rear seat 52 is disposed on the heat shielding plate 62. The heat shielding plate 62 can prevent hot air from transmitting from the muffler 55 to the rear seat 52.

In addition, the seat locking mechanism 90, seat locking member 90, for locking the front portion of the rear seat 52 is provided on the rear cross member 49.

By hooking the rear seat 52 on the rear end of the hook plate 68, the rear end portion of the rear seat 52 can be removably attached to the seat rail 40 with the hook plate 68.

As described above, the rear seat 52 provided on the left and the right seat rails 40L 40R is disposed at a level higher than the muffler 55, and the width is wider than the muffler 55 (See FIG. 9). Therefore, the wide rear seat 52 can shield hot air from the muffler 55. Consequently, hot air is further prevented from climbing toward the occupant.

The left and the right stays 81, 81 are relatively wide plate members passing laterally on outer sides with respect to the muffler 55, and facing their flat planes in the lateral direction. The distance between the left and the right stays 81, 81, dimension in the lateral direction, is smaller than the width of the rear cowl portion of the cowl 58 indicated by imaginary lines. Therefore, the stays 81, 81 can serve as heat shielding members.

As shown in FIG. 8, the heat shielding plate 62 is provided with an integrally formed storage section 62a below the rear seat 52. Articles such as locking tool 69 and so on can be stored in the storage section 62a. The locking tool 69 is a theft proof tool for locking the wheel when parked, and includes, for example, a substantially U-shaped locking strip and a locking rod to be inserted into a pair of legs of the locking strip.

Figure 10:
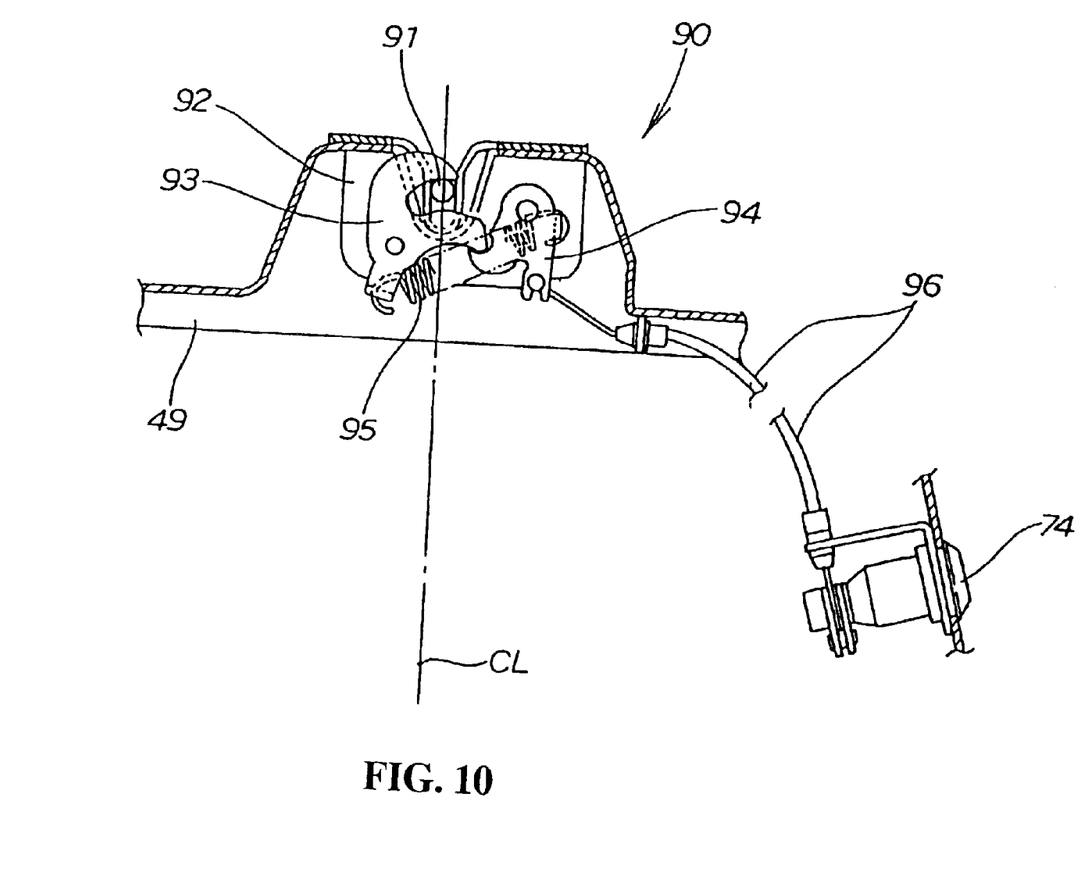
FIG. 10 is a cross-sectional front view of the area around the seat locking mechanism according to the invention.

FIG. 10 is a cross-sectional front view of the area around the seat locking mechanism according to the present invention, showing a state in which the seat locking mechanism 90 is attached on top of the upper portion of the rear cross member 49.

The seat locking mechanism 90 is a seat catch unit for locking an angular U-shaped striker 91 which is opened upward, and which is suspended from under the front portion of the rear seat 52 (See FIG. 8). Such seat locking mechanism 90 includes a frame portion 92 attached to the rear cross member 49, a hook 93 and an engaging member 94 attached to the frame portion 92 so as to be capable of a lateral swinging movement, and a tension spring 95 that extends between the hook 93 and the engaging member 94.

The hook 93 is a locking member for locking the striker 91. The engaging member 94 is a lock holding member for engaging the hook 93 in order to maintain the locked state between the hook 93 and the striker 91. The tension spring 95 is a resilient member for springing back for maintaining engagement between the hook 93 and the engaging member 94.

The engaging member 94 and the key cylinder 74 are connected by a wire cable 96. By unlocking the key cylinder 74, the engaging member 94 and the hook 93 can be unlocked via the wire cable 96.

Figure 11:
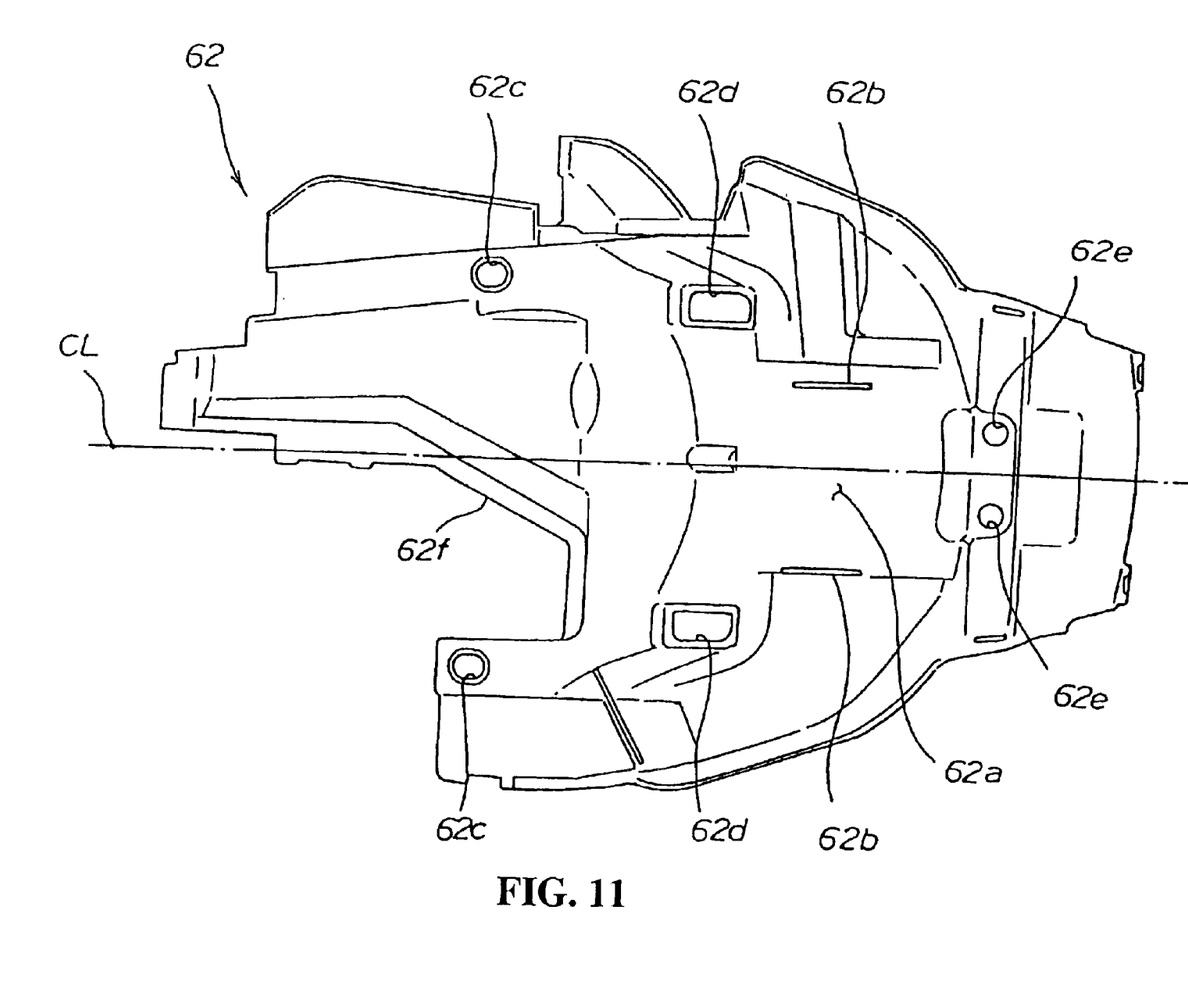
FIG. 11 is a plan view of the heat shielding plate according to the invention.

FIG. 11 is a plan view of the heat shielding plate according to the present invention, showing a general structure of the heat shielding plate 62. The heat shielding plate 62 is provided with the storage section 62a at the position closer to the rear and at the laterally center CL and storage partitioning plates 62b, 62b on the left and the right side of the storage section 62a, left and right front seat mounting holes 62c, 62c at the front thereof, left and right cross member mounting holes 62d, 62d at the center in the fore-and-aft direction, left and right hook mounting holes 62e, 62e at the rear, and a box mounting portion 62f formed by cutting the front left end thereof to a large extent.

Referring now to FIG. 6 to FIG. 8, a description will be made. The front seat mounting holes 62c, 62c are holes for mounting the rear portion of the front seat 51. The cross member mounting holes 62d, 62d are holes for mounting the rear cross member 49. The hook mounting holes 62e, 62e are holes for mounting the hook plate 68. The box mounting portion 62f is a hole for mounting the electric component storage box 71.

The rear portion of the front seat 51 may be attached to the left and the right seat rails 40L, 40R by passing bolts B6 (See FIG. 7) through the front seat mounting holes 62c, 62c.

As shown in FIG. 6, FIG. 8 and FIG. 11, the present invention includes a heat shielding plate 62 for the engine exhaust muffler that is superimposed on the seat rail 40 from above, the hook plate 68 (seat mounting member 68) and rear cross member 49 to which the rear portion of the rear seat 52 is mounted are superimposed on the heat shielding plate 62 from above, the heat shielding plate 62 and the hook plate 68 are secured together to the seat rail 40 with a bolt, and the heat shielding plate 62 and the rear cross member 49 are secured together to the seat rail 40 with a bolt.

In other words, the heat shielding plate 62 and the hook plate 68 are superimposed on the seat rail 40 and secured thereto with a bolt, and the heat shielding plate 62 and the rear cross member 49 are superimposed on the seat rail 40 and secured thereto with a bolt.

Therefore, the heat shielding plate 62, the hook plate 68, the rear cross member 49 can be assembled to the seat rail 40 by a simple operation, and thus assemblability is improved.

Referring to FIG. 5, the description given thus far will be summarized. Since the cross members 47–49 that can be attached to the left and the right halves of seat rails 40L, 40R after assembly by fastening members B1 to B4 is provided with the seat locking member 90 (See FIG. 10), it is not necessary to provide the seat locking member 90 on the seat rails 40L, 40R. Therefore, since the shape of the seat rails 40L, 40R are simplified, they can be easily molded by casting. Since the seat rails 40L, 40R are casts, the seat rails 40L, 40R constructed of the left and the right halves may easily be fabricated.

On the other hand, the cross members 47–49 are only provided with the seat locking member 90, the shape may be simplified. Therefore, it may be formed of a press mold or the like having a simple structure, to be easily manufactured.

In this manner since the left and the right halves of the seat rails 40L, 40R and the cross members 47–49, which can easily be manufactured, are combined and integrated by the fastening members, the seat rail 40 may be easily manufactured.

Furthermore, since the seat rail 40 is constructed of the laterally divided left and right seat rails 40L, 40R, the left and the right seat rails 40L, 40R can be molded with a laterally dividable mold. Therefore, molding is further facilitated.

In the embodiment described above, it is also possible to connect the rear portion of the exhaust pipe 54 to the muffler 55 after being disposed near the left rear frame 40L for securing the space Sp for arranging the on-vehicle components 72, 74, between the rear portion of the exhaust pipe 54 and the right rear frame 40R.

The on-vehicle component is not limited to the battery 72 or the key cylinder 74.

With the arrangement described above, the invention brings out following advantages.

According to the present invention, since the rear portion of the exhaust pipe is disposed near the left rear frame or the right rear frame, a sufficient space for arranging the on-vehicle component can be secured between the rear portion of the exhaust pipe and the right rear frame or the left rear frame. In addition, the motorcycle is not increased in size.

Since the on-vehicle component is disposed in a space opposite from the exhaust pipe, the heat effect of the exhaust pipe can be minimized. Therefore, mounting of the on-vehicle component on the motorcycle is further facilitated.

According to the present invention, since the on-vehicle component is the key cylinder for opening and closing the seat locking mechanism for detachably engaging the seat with the rear portion of the vehicle body frame, a space for arranging the key cylinder can easily be secured at a position which is less effected by heat from the exhaust pipe The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a motorcycle comprising a front wheel, an engine, and a rear wheel disposed on a vehicle body in this order from the front toward the rear, an exhaust pipe extends rearwardly from the engine, and a muffler is provided at the rear end of the exhaust pipe, a rear structure of the motorcycle comprising:
   a vehicle body frame between left and right rear frames positioned above the rear wheel, said muffler being disposed on a rear portion of said vehicle body frame;
   a rear portion of the exhaust pipe is connected to the muffler after being disposed near the left rear frame or the right rear frame;
   a space for arranging an on-vehicle component, said space being positioned between the rear portion of the exhaust pipe and the right rear frame or the left rear frame; and
   a seat movably mounted relative to said vehicle body frame for selectively permitting access to said space.

2. The rear structure of a motorcycle according to claim 1, wherein the on-vehicle component is a key cylinder for opening and closing a seat locking mechanism for detachably engaging the seat with the rear portion of the vehicle body frame.

3. The rear structure of a motorcycle according to claim 2, wherein the vehicle body frame includes a hook plate and said seat includes a hook for selectively mating with said hook plate for securing a rear portion of said seat to said vehicle body frame.

4. The rear structure of a motorcycle according to claim 2, wherein said seat locking mechanism is a seat catch unit for locking with a striker mounted on said seat.

5. The rear structure of a motorcycle according to claim 4, wherein the seat locking mechanism includes a frame portion attached to a said vehicle body frame, a hook and an engaging member attached to the frame portion, said engaging member being capable of a lateral swinging movement and a tension spring extending between the hook and the engaging member for normally biasing said hook to a closed position for engaging said striker and retaining said seat in a closed position relative to said vehicle body frame.

6. The rear structure of a motorcycle according to claim 5, wherein the hook is a locking member for locking the striker and the engaging member is a lock holding member for engaging the hook in order to maintain the locked state between the hook and the striker.

7. The rear structure of a motorcycle according to claim 6, wherein the tension spring is a resilient member for springing back for maintaining engagement between the hook and the engaging member.

8. The rear structure of a motorcycle according to claim 4, wherein the striker is an angular U-shaped member.

9. The rear structure of a motorcycle according to claim 5, and further including a cable operatively positioned between the key cylinder and engaging member for selectively locking and unlocking said hook from the striker.

10. The rear structure of a motorcycle according to claim 5, wherein the hook includes a first member for engaging said striker and a second member for engaging said engaging member, said engaging member includes a recess formed on an engaging arm for receiving a portion of said second member of said hook and for selectively impartment movement thereto.

11. A rear structure adapted to be used with a motorcycle comprising:
   left and right rear frames positioned above a rear wheel, said left and right rear frames being spaced relative to each other;
   a muffler being disposed on a rear portion of a vehicle body frame and disposed between the left and right rear frames;
   a space for arranging an on-vehicle component, said space being positioned between a rear portion of an exhaust pipe and the right rear frame or the left rear frame; and
   a seat movably mounted relative to said vehicle body frame for selectively permitting access to said space.

12. The rear structure according to claim 11, wherein the on-vehicle component is a key cylinder for opening and closing a seat locking mechanism for detachably engaging the seat with the rear portion of the vehicle body frame.

13. The rear structure according to claim 12, wherein the vehicle body frame includes a hook plate and said seat includes a hook for selectively mating with said hook plate for securing a rear portion of said seat to said vehicle body frame.

14. The rear structure according to claim 12, wherein said seat locking mechanism is a seat catch unit for locking with a striker mounted on said seat.

15. The rear structure according to claim 14, wherein the seat locking mechanism includes a frame portion attached to a said vehicle body frame, a hook and an engaging member attached to the frame portion, said engaging member being capable of a lateral swinging movement and a tension spring extending between the hook and the engaging member for normally biasing said hook to a closed position for engaging said striker and retaining said seat in a closed position relative to said vehicle body frame.

16. The rear structure according to claim 15, wherein the hook is a locking member for locking the striker and the engaging member is a lock holding member for engaging the hook in order to maintain the locked state between the hook and the striker.

17. The rear structure according to claim 16, wherein the tension spring is a resilient member for springing back for maintaining engagement between the hook and the engaging member.

18. The rear structure according to claim 14, wherein the striker is an angular U-shaped member.

19. The rear structure according to claim 15, and further including a cable operatively positioned between the key cylinder and engaging member for selectively locking and unlocking said hook from the striker.

20. The rear structure according to claim 15, wherein the hook includes a first member for engaging said striker and a second member for engaging said engaging member, said engaging member includes a recess formed on an engaging arm for receiving a portion of said second member of said hook and for selectively impartment movement thereto.

* * * * *